(No Model.)
C. MILLS.
STAND FOR GRINDING ROLLS OF CARDING ENGINES.
No. 542,270. Patented July 9, 1895.
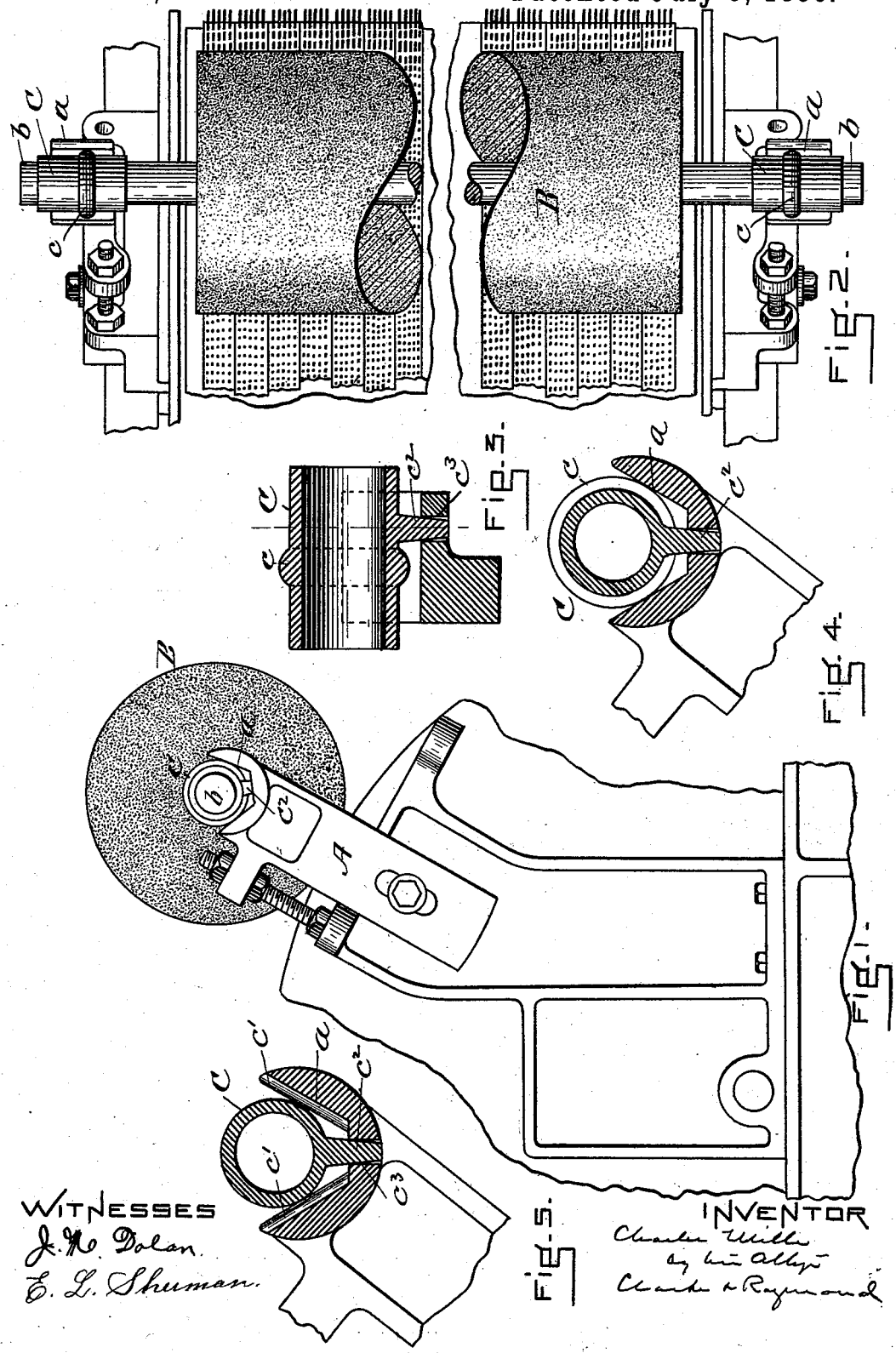
Witnesses
J. H. Dolan.
E. L. Shuman.
Inventor
Charles Mills
by his Attys
Charles & Raymond

UNITED STATES PATENT OFFICE.

CHARLES MILLS, OF NEWTON, MASSACHUSETTS, ASSIGNOR TO THE PETTEE MACHINE WORKS, OF SAME PLACE.

STAND FOR GRINDING-ROLLS OF CARDING-ENGINES.

SPECIFICATION forming part of Letters Patent No. 542,270, dated July 9, 1895.

Application filed May 26, 1894. Serial No. 512,575. (No model.)

*To all whom it may concern:*

Be it known that I, CHARLES MILLS, a subject of Victoria, Queen of Great Britain, residing at Newton, in the county of Middlesex and State of Massachusetts, have invented a new and useful Stand for the Grinding-Rolls of Carding-Engines, of which the following is a full, clear, and exact description, reference being had to the accompanying drawings, forming a part of this specification, in explaining its nature.

The grinding of cylinders, doffers, and flats of carding-engines requires a mechanism which shall be very finely and delicately adjusted to its work, because the grinding must be done with great exactness, and it therefore becomes very necessary to hang or support the grinding-roll very accurately in order that its grinding-surface may have the correct level and bear a true relation to the cylinder, &c., which it grinds. Heretofore the method of supporting or hanging such roll has been such as to require a great deal of time and expense in the fitting of the roll-shaft to its bearings in the supporting-hangers, and by the use of my present invention the necessity for this work and fitting is largely done away with. This is because of the shape of the bearings in which the shaft rests and because of the employment of the equalizing or swiveling bushing at the bearings or their mechanical equivalents.

Referring to the drawings, Figure 1 is a view in side elevation of a portion of a carding-engine, showing the stand and grinding-roll. Fig. 2 is a plan view of that section of the carding-engine, the stand, and grinding-roll. Fig. 3 is a detail view, in vertical section, lengthwise the bushing and its bearing. Fig. 4 is also a detail view, in vertical section, upon the dotted line of Fig. 3; and Fig. 5 is a detail view in section, illustrating a modification, to which reference is hereinafter made.

The grinding-stands on each side of the carding-engine, instead of having U-shaped bearings to fit the journals of the grinding-roll, have a V-shaped bearing, and in the drawings A represents the stands, and $a$ the V-shaped bearing.

It will be understood, of course, that the grinding-roll has a shaft which extends through it at each end, and that there is a stand or bracket at each side of the machine for holding the shaft, and that the position of these stands upon the engine varies according as the roll is used for grinding the cylinder or the doffers or flats.

B is the grinding-roll, and $b$ the projecting ends of its shaft. Each of these projecting ends has the equalizing or swiveling bushing C, through which the shaft extends, and which has about its outer edge the projecting ring $c$, preferably integral with the bushing, narrow, and the corners of which may be rounded to any desired extent. These bushings form narrow bearings for the shaft and rest upon the inclined sides of the V-bearings in the stands. This provides so narrow a support for the roll that it adjusts itself or is readily adjusted to the desired level.

The bearing-ring is preferably midway the length of the bushing. The effect of the bearing-ring will be obtained by forming on each of the sides of the V-bearing narrow extensions on ribs $c'$, which may have rounded surfaces and upon which ordinary bushings containing the shaft would rest directly. (See Fig. 5.)

It will be apparent that, owing to the V-shaped bearings in which the grinding-roll is supported, whether the ribs be formed on the inclined sides of the V-shaped bearings, as shown in Fig. 5, or on the bushings, as shown in Fig. 4, each of the bushings will touch at but two points and will be separated from the V-shaped bearings throughout the greater portion of their lengths, and the ribs on the inclined sides of the supports, or on the bushings, as the case may be, will be out of contact with the contiguous parts through nearly their entire lengths. This construction renders the roll-supports very sensitive and enables a finer adjustment to be secured than is possible where a U-shaped or annular bearing is used, in which last-named constructions the ribs are in contact with the bearings through the greater part of their peripheries.

I prefer to hold the bushings against endwise movement in their respective supports by providing each with a lug $c^2$, cast or otherwise formed upon it, and which is adapted to enter a hole $c^3$ in the bottom of the V-support. (See Figs. 3 and 5.)

I prefer that the rib or ring be placed midway the length of the bushing length, and where the rib is upon the V-shaped support it may be midway its length or either side thereof, as may be desired, although I prefer the central location.

The advantages of the invention have been mentioned in connection with the above description, and it is obvious that the invention does away with considerable labor in adjusting the stands upon each side of the card into line with each other.

Having thus fully described my invention, I claim and desire to secure by Letters Patent of the United States—

1. A grinding roll stand for carding engines comprising supporting brackets having V-shaped shaft supports and ribbed bushings in which the shaft of the grinding roll is journaled, said bushings being mounted in said brackets so that the ribs are in contact with the inclined sides of the V-shaped shaft support, substantially as described.

2. In a grinding roll stand for carding engines, the combination with V-shaped shaft-supports, of bushings in which the grinding-roll shaft is mounted, said bushings resting upon the inclined sides of said V-shaped supports; but being separated therefrom throughout the greater portion of their lengths and peripheries, and having extensions which enter holes in the supports to prevent endwise movement of said bushings.

CHARLES MILLS.

Witnesses:
F. F. RAYMOND, 2d,
J. M. DOLAN.